United States Patent Office 2,892,285
Patented June 30, 1959

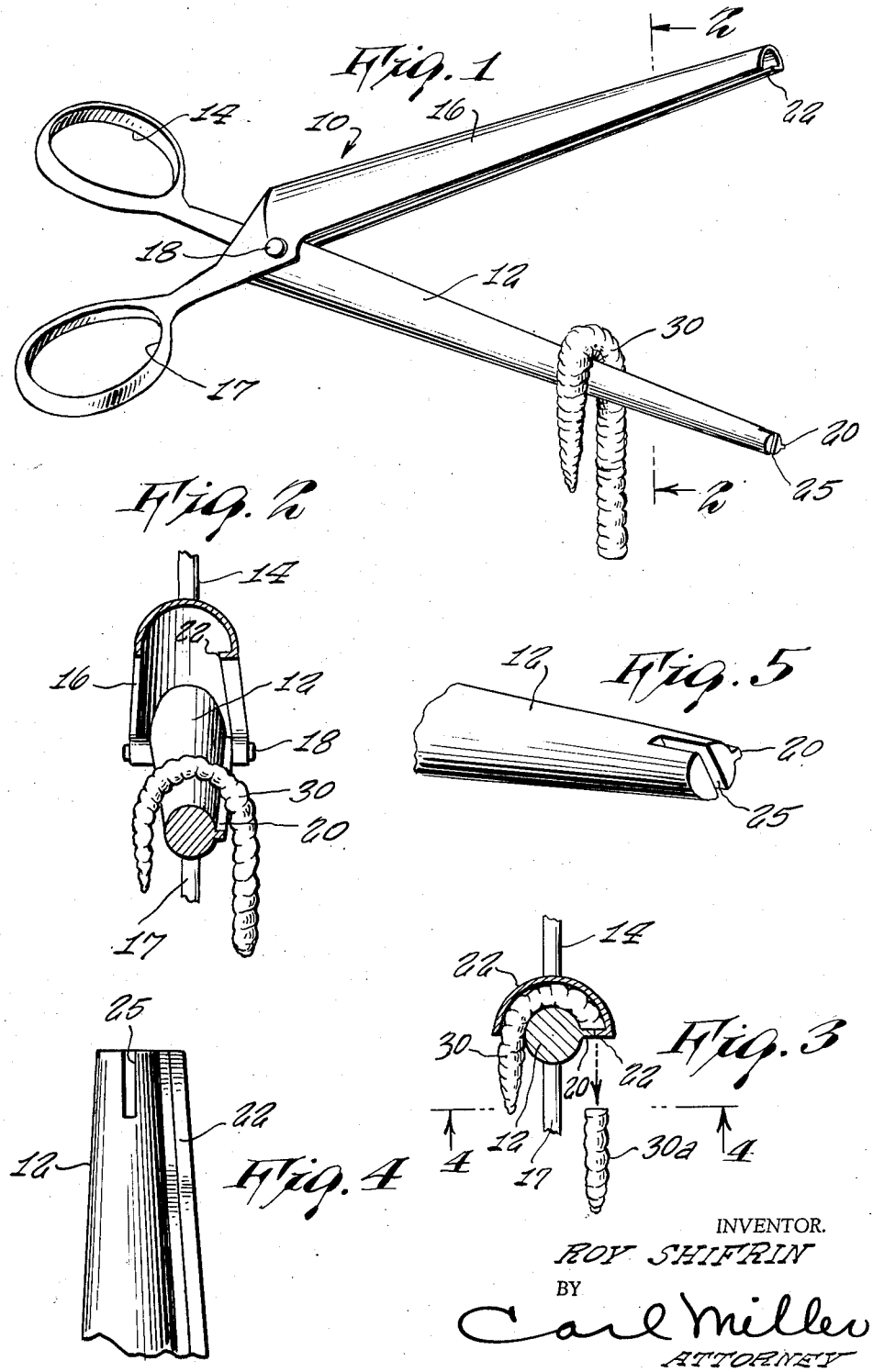

2,892,285

WORM SCISSORS

Roy Shifrin, Bronx, N.Y.

Application January 20, 1958, Serial No. 709,837

3 Claims. (Cl. 43—53.5)

This invention relates to fishing equipment and, more particularly, to a device for baiting fish hooks.

Ordinarily, the baiting of fish hooks with live worms is time consuming, untidy, and inconvenient. Accordingly, an object of the present invention is to provide apparatus for substantially automatically cutting a worm to proper size and facilitating the placing of the worm upon the fish hook that is simple in construction, efficient in operation, and which will overcome the aforementioned problems.

Another object of the present invention is to provide fish hook baiting apparatus which can be used to bait a hook with a piece of a live worm sufficiently large for the particular hook being baited in such a way that it is completely unnecessary to touch the bait.

Still another object of the present invention is to provide a worm scissors of the type described that includes means for dislodging a hook from a fish after the fish has been caught.

All of the foregoing and still further objects and advantages of this invention will become apparent from a study of the following specification, taken in connection with the accompanying drawing, wherein:

Figure 1 is a perspective view of a worm scissor made in accordance with the present invention in operative use;

Figure 2 is a transverse cross sectional view taken along line 2—2 of Figure 1;

Figure 3 is a view similar to Figure 2, showing the parts in the fully engaged position;

Figure 4 is an enlarged bottom plan view of the apparatus shown in Figure 3; and Figure 5 is an enlarged fragmentary perspective view of the front end of one of the scissor members.

Referring now to the drawing and, more particularly, to Figures 1 to 3 thereof, a pair of worm scissors 10 made in accordance with the present invention is shown to include a forwardly tapered conical member 12 having a finger receiving plate 14 at the rear end thereof. A mating forwardly tapering hollow semi circular member 16 having a finger receiving plate 17 at its rear end is hingedly connected to the conical member 12 by means of a transversely extending pivot pin 18.

The slope of each of the tapering conical and tapering hollow members is substantially the same, while the radius of curvature of the inside concave surface of the hollow member 16 is slightly larger than the radius of curvature of the corresponding portion of the conical member so as to define a segmental hollow cylindrical space of uniform size between the members when they are in the completely closed position. Thus, a worm of average diameter may be supported at any point along the length of the conical member 12 without the danger of crushing it as the concave member 16 is moved into closing engagement therewith. Cutting means associated with the scissors includes a shear plate 20 that extends laterally outwardly from one side of the conical member 12 and a cooperating shear plate 22 which extends laterally inwardly from the hollow member 16. These ribs are movable in opposite directions toward each other within spaced apart parallel planes during movement of the respective members toward each other so as to effect a shearing action therebetween.

In actual use, the conical member 12 may be used as a probe to select the desired worm from the bait box, during which it may be flipped over the section of the conical member having a diameter corresponding to the diameter of the particular hook being baited, with a sufficient length of the worm extending downwardly from the side of the conical member 12 opposite the shear rib 20 to cover the desired amount of the hook after it is baited. By then bringing the finger plates 14, 17 together, the shearing action of the shear ribs 20, 22 will sever the worm 30, thus dropping the remaining portion of the worm 30a back into the bait box. The finger plates are held together with slight pressure so that the worm is positioned in place while the fish hook is placed through it with a simple twisting motion. With the bait secured upon the hook in this manner, the scissors are opened and the baited hook is removed ready for use.

With reference to Figure 5 of the drawing, it will also be noted that the forward end of the conical member 12 is provided with a longitudinally extending and forwardly opening notch 25 for engaging the hook and dislodging it from a fish that has been caught. This is but an added feature of the present invention which further enhances the usefulness of the device.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A pair of worm scissors comprising, in combination, a forwardly tapering conical main body member having a finger receiving plate at the rear end, a cooperating forwardly tapering hollow semi-circular member having another finger receiving plate at the rear end, means pivotally connecting at one end thereof said hollow and conical portions together, said hollow member receiving said conical member in response to movement of said finger receiving plates toward each other, and cutting means carried by said hollow and conical members for severing a worm during said movement, said cutting means comprising a longitudinal and laterally outwardly extending shear rib integral with said conical member, and a longitudinal and laterally inwardly extending shear rib integral with said hollow member, said ribs being displaceable in opposite directions toward sliding engagement with each other to produce a shearing action therebetween.

2. A pair of worm scissors as set forth in claim 1, wherein said tapering conical member and said tapering hollow member are of equal slope, and the radius of curvature of the inside concave surface of said hollow member is larger than the radius of curvature of the corresponding portion of said conical member so as to define a segmental hollow cylindrical space of uniform size between said members when in a completely closed position.

3. A pair of worm scissors as set forth in claim 2, wherein the outermost front end of said conical member defines a forwardly opening longitudinal slot for dislodging fish hooks.

References Cited in the file of this patent

UNITED STATES PATENTS 2,493,142    Hutton _____ Jan. 3, 1950